(12) United States Patent
Becker et al.

(10) Patent No.: US 8,283,810 B2
(45) Date of Patent: *Oct. 9, 2012

(54) SYSTEM AND METHOD FOR GENERATOR PHASE SIGNAL MONITORING AND CONTROL OF ELECTRICAL CURRENT DISTRIBUTION

(75) Inventors: James Becker, Crystal Lake, IL (US);
Issam Jabaji, Glenview, IL (US);
Ciaran Patterson, Chicago, IL (US)

(73) Assignee: C.E. Niehoff & Co., Evanston, IL (US)

( * ) Notice: Subject to any disclaimer, the term of this patent is extended or adjusted under 35 U.S.C. 154(b) by 382 days.

This patent is subject to a terminal disclaimer.

(21) Appl. No.: 12/592,569

(22) Filed: Nov. 25, 2009

(65) Prior Publication Data

US 2010/0138071 A1    Jun. 3, 2010

Related U.S. Application Data

(63) Continuation-in-part of application No. 12/460,659, filed on Jul. 23, 2009, now Pat. No. 8,227,941, and a continuation-in-part of application No. 12/229,354, filed on Aug. 23, 2008, now Pat. No. 7,737,582, which is a continuation of application No. 11/040,339, filed on Jan. 21, 2005, now Pat. No. 7,432,613.

(60) Provisional application No. 61/275,390, filed on Aug. 27, 2009.

(51) Int. Cl.
*H01H 9/54* (2006.01)
(52) U.S. Cl. .......................................... 307/140; 307/9.1
(58) Field of Classification Search .................. 307/140, 307/9, 1
See application file for complete search history.

(56) References Cited

U.S. PATENT DOCUMENTS

| | | | |
|---|---|---|---|
| 3,971,007 A | 7/1976 | Borkovitz et al. |
| 4,044,296 A | 8/1977 | Dhyanchand et al. |
| 4,317,223 A | 2/1982 | Farmer, Jr. |
| 4,348,629 A | 9/1982 | Sievers |
| 4,399,409 A | 8/1983 | Thompson |
| 4,403,292 A | 9/1983 | Ejzak et al. |
| 4,412,169 A | 10/1983 | Dell'Orto |
| 4,430,292 A | 2/1984 | Shimada et al. |
| 4,452,079 A | 6/1984 | Tiller |
| 4,467,277 A | 8/1984 | Jones et al. |
| 4,471,299 A | 9/1984 | Elmis |
| 4,496,900 A | 1/1985 | Di Stefano et al. |

(Continued)

*Primary Examiner* — Robert L. Deberadinis
(74) *Attorney, Agent, or Firm* — Law Offices of Michael M. Ahmadshahi

(57) ABSTRACT

An electrical system comprises a generator and a control device coupled with the generator and operable to control electrical current through the electrical system via a switch module. The control device determines a loss of symmetry between two alternating phase signals generated by a first and second phase windings of a single or multiple stator generator. Specifically, the control device determines a first and second average values of two of the two or more alternating phase signals and operates to control electrical current distribution throughout the electrical system, via one or more switch modules, when the first average value differs from the second average value by a predetermined value. The control device may be further configured to sense average magnitudes of the electrical current in either direction between two electrical components, coupled with a switch module, and switch on/off the electrical current in either direction, via the switch module, to insure that the average magnitude of electrical current between the electrical components in either direction does not exceed one or more default average magnitudes.

25 Claims, 9 Drawing Sheets

U.S. PATENT DOCUMENTS

| | | |
|---|---|---|
| 4,607,246 A | 8/1986 | Wada et al. |
| 4,806,846 A | 2/1989 | Kerber |
| 4,937,530 A | 6/1990 | Vogt et al. |
| 5,107,198 A | 4/1992 | Meyer et al. |
| 5,126,678 A | 6/1992 | Williams |
| 5,182,511 A | 1/1993 | Pierret et al. |
| 5,315,229 A | 5/1994 | Markus |
| 5,517,422 A | 5/1996 | Ilic et al. |
| 5,602,470 A | 2/1997 | Kohl et al. |
| 5,672,974 A | 9/1997 | Turner |
| 5,929,612 A | 7/1999 | Eisenhaure et al. |
| 6,147,474 A | 11/2000 | Koss et al. |
| 6,157,175 A | 12/2000 | Morinigo et al. |
| 6,172,509 B1 | 1/2001 | Cash et al. |
| 6,404,222 B1 | 6/2002 | Fan et al. |
| 6,696,773 B2 | 2/2004 | Taniguchi |
| 6,696,828 B2 | 2/2004 | Yoshizawa |
| 6,744,239 B2 | 6/2004 | Fukushima et al. |
| 6,762,593 B2 | 7/2004 | Kusase et al. |
| 6,791,301 B2 | 9/2004 | Henkel et al. |
| 6,801,020 B2 | 10/2004 | Blackburn |
| 7,026,724 B1 | 4/2006 | Blackburn |
| 7,138,729 B2 | 11/2006 | Bailey |
| 7,432,613 B2 | 10/2008 | Jebaji et al. |
| 2002/0024323 A1 | 2/2002 | Fukushima et al. |
| 2002/0101221 A1 | 8/2002 | Stefanovic et al. |
| 2003/0006740 A1 | 1/2003 | Henkel et al. |
| 2003/0071633 A1 | 4/2003 | Fedirchuk et al. |
| 2004/0100228 A1 | 5/2004 | Blackburn |
| 2005/0067900 A1 | 3/2005 | Bailey |
| 2006/0273765 A1 | 12/2006 | Mellor et al. |
| 2006/0290324 A1 | 12/2006 | Jabaji |
| 2007/0013387 A1 | 1/2007 | Smith et al. |
| 2007/0018637 A1 | 1/2007 | Kim et al. |
| 2007/0069579 A1 | 3/2007 | Bailey |
| 2011/0018504 A1* | 1/2011 | Patterson ............... 322/28 |

* cited by examiner

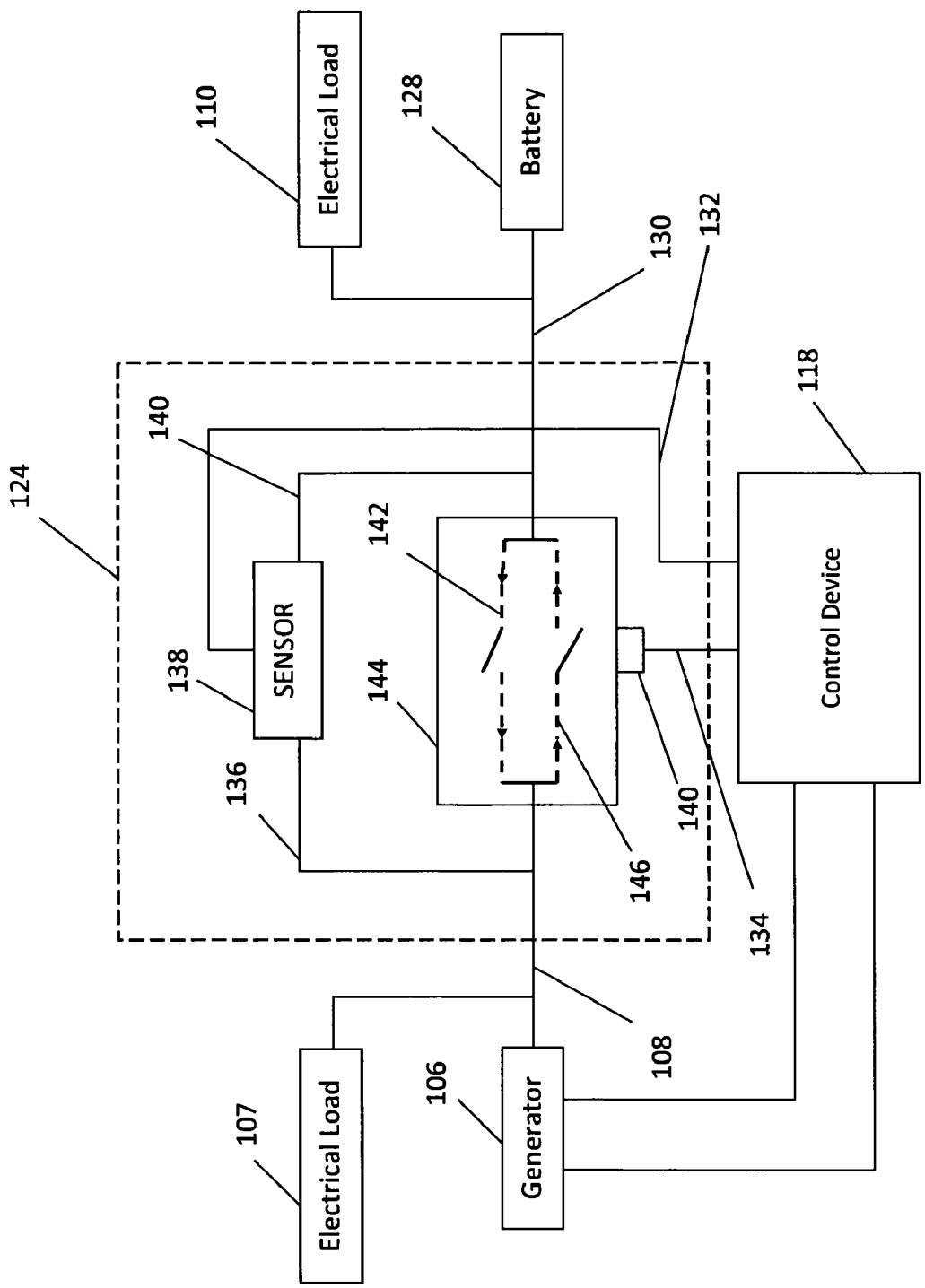
*FIG. 1-A*

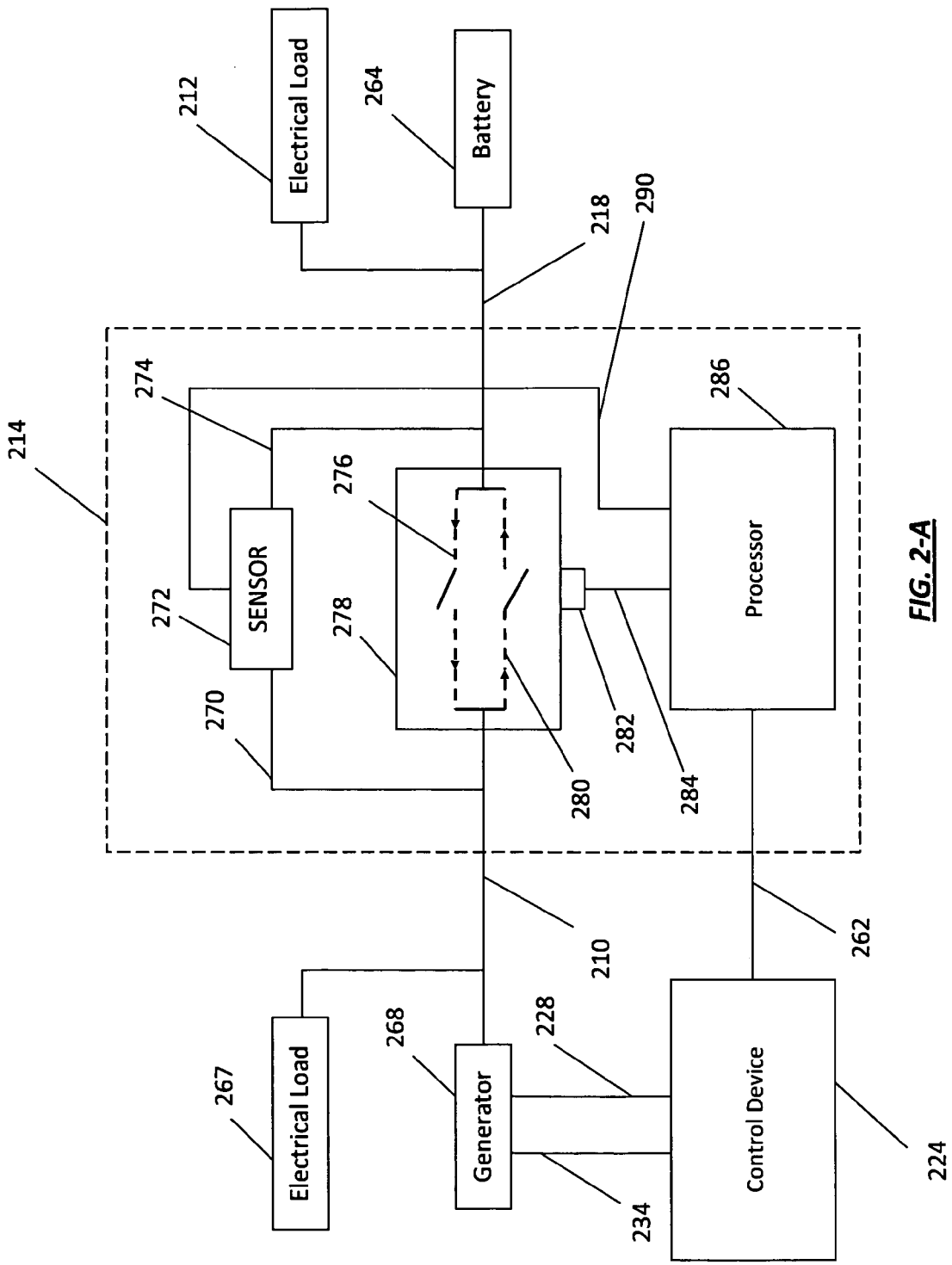
FIG. 2-A

SYSTEM AND METHOD FOR GENERATOR PHASE SIGNAL MONITORING AND CONTROL OF ELECTRICAL CURRENT DISTRIBUTION

CROSS REFERENCE TO RELATED APPLICATIONS

The present patent application is a formalization of a previously filed, provisional patent application entitled "System and Method for Generator Phase Signal Monitoring and Control of Electrical Current Distribution," filed Aug. 27, 2009, as U.S. patent application Ser. No. 61,275,390 by the inventor(s) named in this application. This patent application claims the benefit of the filing date of the cited provisional patent application according to the statutes and rules governing provisional patent applications, particularly 35 USC §119 and 37 CFR §1.78. The specification and drawings of the cited provisional patent application are specifically incorporated herein by reference. The present patent application is further a continuation-in-part of a non-provisional patent application entitled "System and Method for Generator Phase Signal Monitoring and Control," filed Jul. 23, 2009 now U.S. Pat. No. 8,227,941, as U.S. patent application Ser. No. 12/460,659 by one or more common inventor(s). The present patent application is further a continuation-in-part of a non-provisional patent application entitled "Self-Protective High-Current Low-Loss Bi-Directional Semiconductor Switch Module and Method of Operation," filed Aug. 23, 2008 now U.S. Pat. No. 7,737,582, as U.S. patent application Ser. No. 12/229,354 by one or more common inventor(s) which, in turn, was a continuation of a co-pending non-provisional patent application entitled "Self-Protective High-Current Low-Loss Bi-Directional Semiconductor Switch Module and Method of Operation," filed Jan. 21, 2005, as U.S. patent application Ser. No. 11/040,339, now U.S. Pat. No. 7,432,613 by one or more common inventor(s). This patent application also claims the benefit of the filing dates of the cited non-provisional patent applications according to the statutes and rules governing non-provisional patent applications, particularly 35 USC §120 and 37 CFR §1.78. The specification and drawings of the cited non-provisional patent applications are specifically incorporated herein by reference

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a system and method for monitoring and control of a generator and electrical current in an electrical system. In particular, this invention relates to a control device, including a system and method, which monitors the phase signals generated by the generator's phase windings and controls one or more switches to control the magnitude and direction of electrical current through the electrical system according to the phase signals. The control device may be used in conjunction with the generator for improved monitoring, diagnostics, and control functions.

BACKGROUND

The present invention relates to a control device, including a system and method, for monitoring a generator's phase signals in order to control electrical current distribution through an electrical system via one or more switch modules. In particular, the control device monitors two phase signals, generated by the generator phase windings, and responses to a loss of symmetry in the phase signals. The control device achieves this by comparing the two phase signals to one another as opposed to predetermined values. One of the advantages of the present method of relative comparison between two phases is that it eliminates the need to determine other parameters that affect the predetermined values, such as generator speed, electrical load, and direction of rotation. It should be noted that the term symmetry refers to the symmetry between different waveforms associated with the different phases, not for the positive and negative parts of an individual waveform associated with each of the two phases as is the case for traditional determination of AC system health. The loss of symmetry is generally an indication of generator malfunction which may damage the generator itself and/or electrical components in the electrical system. Upon detection of such loss of symmetry, the control device operates to control the magnitude and direction of electrical current through the electrical system via a switch module. It should be noted that the switch module 124 is a bi-directional switch module capable of controlling electrical current in either direction. Alternatively, the control device may only generate a warning signal in response to the loss of symmetry.

Electrical systems, such as those implemented in modern vehicles or generator sets, include complex electronics and electrical equipment. Such electrical systems are normally comprised of an internal combustion engine and a generator. The engine supplies the generator with mechanical power where it is converted to electrical power. In a vehicle, for instance, the generator generates electrical power for the vehicle electrical system when the vehicle's engine is operating. In a generator set, the engine's mechanical power is converted to electrical power by the generator which is available via power output connectors. Such electrical systems further include energy storage devices such as batteries. The batteries and generator can operate either as a load or a source. Whenever the generator is not operating or can not produce sufficient electrical power, including the engine start process, the batteries provide electrical energy to the electrical system. The generator functions as a source of electrical energy after it attains a certain RPM, at which point electrical power is generated by the generator and delivered to the batteries and other electrical power consuming components within the electrical system.

Ordinarily, the generator includes a voltage regulator that maintains the generator voltage at a regulation voltage. Modern generators include a control device that, in addition to regulating the generator voltage, operates to monitor the generator performance in relation with the vehicle electrical and mechanical system. For instance, in a commonly assigned U.S. Pat. No. 7,466,107 entitled "System and Method for Electric Current and Power Monitoring and Control of a Generator," hereby incorporated by reference in its entirety, a control device in combination with a generator was disclosed where the control device operated to limit or cease the generator output current in response to an overload detected by measuring a voltage drop across a conductor embedded in the generator. The control device further operated to control the generator output current as a function of battery temperature, battery type, battery voltage, and the ratio between the RPMs of the engine and generator. Also, see Jabaji, U.S. Pat. No. 7,276,804 where a voltage regulator has been disclosed which, in addition to regulating the generator output voltage, operates to discern and respond to regulator, generator, and vehicle electrical system operation and malfunctions; Becker et al., U.S. Pat. No. 6,184,661, where the control device operates to limit the generator output power in order to protect the engine from excessive generator torque; and Jabaji, U.S. Pat. No. 5,907,233, where the control device monitors the AC signal generated by the stator windings and, in the absence of the AC signal, removes the field coil current in order to protect the battery from excessive drain.

In order to provide supplemental monitoring, diagnostics, and control functions, the control device may monitor the signals generated by the phase windings and control the magnitude and direction of electrical current through the electrical system. It should be noted that the present invention is not limited to sinusoidal, square, quasi-square, or any other form of symmetric waveform. A typical generator comprises stator windings that produce the generator output current via a varying magnetic field. Multi-phase generators have multiple stator windings that are connected via Δ (delta) or Y arrangement, known to skilled artisans. Each phase carries a proportional amount of the total generator output current. For instance in a 3-phase generator, each phase carries approximately ⅓ of the total generator output current, assuming the phase windings are identical.

Generators produce electrical power via their phase windings. In a multi-phase generator, the total electrical power generated by the generator is the sum of the electrical power generated by the individual phase windings. Accordingly, monitoring their performance can be useful in determining the performance of the generator. The signals generated by the phase windings can be compared to ascertain fault conditions associated with the generator. A loss of symmetry in the phase signals most likely is an indication of a malfunctioning generator. As stated above, the term symmetry refers to the symmetry between different waveforms associated with the different phases, not for the positive and negative parts of an individual waveform associated with each of the two phases as is the case for traditional determination of AC system health. Specifically, the loss of symmetry could be due to shorted phase windings and/or one or more faulty rectifying diodes. When such malfunctions occur, it is desirable to control the distribution of electrical current in the electrical system.

In general, when the generator malfunctions, it is desirable to control the magnitude and direction of electrical current between electrical components in the vehicle electrical system. The electrical components may be either a source or a load. In fact, a generator or a battery in a vehicle electrical system can operate both as a source of electrical energy or as an electrical load. During start up, the battery operates as an electrical energy source that provides electrical power to the electrical components such as a starter motor to start the engine. When the vehicle's engine is operating and the generator achieves a certain RPM, the battery becomes an electrical load receiving electrical energy from the generator. Conversely, before the generator achieves the required RPM, it operates as an electrical load receiving electrical energy from the battery. When the engine is operating, the generator becomes the source of electrical energy for the electrical components in the system including the battery.

A generator's phase windings may fail because of a short between windings, within winding turns, alternator casing, or the like. When this occurs, the shorted generator's windings become a large electrical load for any other electrical energy source in the electrical system. Specifically, during normal operation, electrical current flows from the generator to the battery. When the generator fails the direction of electrical current is reversed, i.e., it flows from the battery to the generator. Not only will this situation give rise to wasted electrical energy, it can also cause excessive temperature of the phase windings. This situation could be delayed or avoided if the magnitude and direction of electrical current is controlled via a switch module so as to prevent electrical energy flow into the generator.

SUMMARY

In one aspect, a vehicle electrical system is disclosed comprising a generator coupled with a control device which operates to control electrical current distribution through the vehicle electrical system. The generator comprises two or more phase windings associated with one or more stators, said two or more phase windings operative to generate two or more alternating phase signals. The control device is responsive to the two or more alternating phase signals and operates to determine a first and second average values of two of the two or more alternating phase signals, and to control the electrical current through the vehicle electrical system, via a switch module, when the first average value differs from the second average value by a predetermined value.

According to one preferred embodiment, the switch module comprises (i) a bi-directional switch capable of switching on/off the electrical current in either direction between a first and a second terminal of the bi-directional switch in response to a control signal applied to a control terminal of the bi-directional switch and (ii) a sensor capable of sensing an average magnitude of the electrical current in either direction between the first and the second terminal of the bi-directional switch, wherein the control device is further configured to sense the average magnitude of the electrical current in either direction, via the sensor, and, in response to the sensed average magnitude, to controllably switch on/off the electrical current in either direction by applying a first signal to the control terminal of the bi-directional switch so that the average magnitude does not exceed one or more default average magnitudes. Preferably, the bi-directional switch comprises a bi-directional semiconductor switch. Preferably, the sensor comprises an electrical current sensor capable of sensing an average magnitude of the electrical current in either direction.

According to one preferred embodiment, the control device is configured to apply a control signal to the switch module to control the electrical current through the vehicle electrical system. Preferably, the switch module comprises (i) a bi-directional switch capable of switching on/off the electrical current in either direction between a first and a second terminal of the bi-directional switch in response to a control signal applied to a control terminal of the bi-directional switch, (ii) a sensor capable of sensing an average magnitude of the electrical current in either direction between the first and the second terminal of the bi-directional switch, and (iii) a processor, including a programmable code operable on the processor, wherein the processor is responsive to the control signal and configured to sense the average magnitude of the electrical current in either direction, via the sensor, and, in response to the sensed average magnitude, to controllably switch on/off the electrical current in either direction by applying a first signal to the control terminal of the bi-directional switch so that the average magnitude does not exceed one or more default average magnitudes. Preferably, the switch module comprises (i) a bi-directional switch capable of switching on/off the electrical current in either direction between a first and a second terminal of the bi-directional switch in response to a control signal applied to a control terminal of the bi-directional switch, (ii) a sensor capable of sensing an average magnitude of the electrical current in either direction between the first and the second terminal of the bi-directional switch, and (iii) a processor, including a programmable code operable on the processor, wherein the processor is responsive to the control signal and configured to sense the average magnitude of the electrical current in either direction, via the sensor, and, in response to the sensed average magnitude, to controllably switch off the electrical current flowing into the generator by applying a first signal to the control terminal of the bi-directional switch. Preferably, the control signal is applied when a ratio between the first and second average values is outside of a predetermined range.

In another aspect, a method for controlling a vehicle electrical system including a generator is disclosed wherein the method comprises (a) generating two or more alternating phase signals via two or more phase windings associated with one or more stators included in the generator, (b) determining a first and second average values of two of the two or more alternating phase signals, and (c) controlling electrical current through the vehicle electrical system, via a switch module, when the first average value differs from the second average value by a predetermined value.

According to one preferred embodiment, the switch module comprises (i) a bi-directional switch capable of switching on/off the electrical current in either direction between a first and a second terminal of the bi-directional switch in response to a control signal applied to a control terminal of the bi-directional switch, and (ii) a sensor capable of sensing an average magnitude of the electrical current in either direction between the first and the second terminal of the bi-directional switch, and the method further comprises (d) sensing the average magnitude, via the sensor, wherein (c) comprises, in response to the sensed average magnitude, controllably switching on/off the electrical current in either direction by applying a first signal to the control terminal of the bi-directional switch so that the average magnitude does not exceed one or more default average magnitudes.

In another aspect, a control device for a vehicle electrical system including a generator is disclosed. The generator comprises two or more phase windings associated with one or more stators, said two or more phase windings operative to generate two or more alternating phase signals. The control device comprises (i) a switch module, and (ii) a processor, including a programming code operable on the processor, coupled with the two or more phase windings and the switch module, wherein said processor is configured to (a) measure the two or more alternating phase signals, via two or more lines, (b) determine a first and second average values of two of the two or more alternating phase signals, and (c) apply a control signal to the switch module to control electrical current through the vehicle electrical system, via a control line, when the first average value differs from the second average value by a predetermined value.

According to one preferred embodiment, the switch module comprises (i) a bi-directional switch capable of switching on/off the electrical current in either direction between a first and a second terminal of the bi-directional switch in response to the control signal applied to a control terminal of the bi-directional switch, and (ii) a sensor capable of sensing an average magnitude of the electrical current in either direction between the first and the second terminal of the bi-directional switch, wherein said processor is further configured to measure the average magnitude of the electrical current in either direction, via a sense line, and, in response to the measured average magnitude, to controllably switch on/off the electrical current in either direction by applying a first signal to the control terminal of the bi-directional switch, via the control line, so that the average magnitude does not exceed one or more default average magnitudes. Preferably, the sensor is further capable of sensing an instantaneous magnitude of the electrical current in either direction, and wherein the processor is further configured to measure the instantaneous magnitude of the electrical current in either direction, via the sense line, and, in response to the measured instantaneous magnitude, to switch off the electrical current in either direction by applying a second signal to the control terminal, via the control line, when the instantaneous magnitude is greater than one or more surge magnitudes. Preferably, the sensor is further capable of sensing an instantaneous magnitude of the electrical current in either direction, and wherein the processor is further configured to measure the instantaneous magnitude of the electrical current in either direction, via the sense line, and, in response to the measured instantaneous magnitude, to determine a time interval beginning at a time when the instantaneous magnitude rises above one or more overflow magnitudes and ending at a time when the instantaneous magnitude falls below the one or more overflow magnitudes, and to switch off the electrical current in either direction by applying a second signal to the control terminal, via the control line, when the time interval is substantially equal to one or more overflow time intervals. Preferably, the sensor is further capable of sensing a difference magnitude of the electrical current in either direction between two consecutive instantaneous magnitudes of the electrical current obtained a difference time interval apart, and wherein the processor is further configured to measure the difference magnitude of the electrical current in either direction, via the sense line, and, in response to the measured difference magnitude, to switch off the electrical current in either direction by applying a second signal to the control terminal, via the control line, when the difference magnitude is greater than one or more change magnitudes. Preferably, the sensor is further capable of sensing a temperature of the bi-directional switch module, and wherein the processor is further configured to measure the temperature, via the sense line, and, in response to the measured temperature, to switch off the electrical current in either direction by applying a second signal to the control terminal, via the control line, when the temperature is greater than one or more overheat temperatures.

In another aspect, a method for controlling electrical current through a vehicle electrical system including a generator is disclosed. The generator comprises two or more phase windings associated with one or more stators, said two or more phase windings operative to generate two or more alternating phase signals. The method comprises (a) measuring the two or more alternating phase signals, via two or more lines, (b) determining a first and second average values of two of the two or more phase signals, and (c) applying a control signal to a switch module to control the electrical current through the vehicle electrical system, via a control line, when the first average value differs from the second average value by a predetermined value.

According to one preferred embodiment, the switch module comprises (i) a bi-directional switch capable of switching on/off the electrical current in either direction between a first and a second terminal of the bi-directional switch in response to the control signal applied to a control terminal of the bi-directional switch, and (ii) a sensor capable of sensing an average magnitude of the electrical current in either direction between the first and the second terminal of the bi-directional switch, and the method further comprises (d) measuring the average magnitude of the electrical current in either direction, via a sense line, wherein (c) comprises, in response to the measured average magnitude, controllably switching on/off the electrical current in either direction by applying a first signal to the control terminal of the bi-directional switch, via the control line, so that the average magnitude does not exceed one or more default average magnitudes. Preferably, the sensor is further capable of sensing an instantaneous magnitude of the electrical current in either direction, wherein (d) comprises measuring the instantaneous magnitude of the electrical current in either direction, via the sense line, and wherein (c) comprises, in response to the measured instantaneous magnitude, switching off the electrical current in either direction by applying a second signal to the control terminal, via the control line, when the instantaneous magnitude is greater than one or more surge magnitudes. Preferably, the sensor is further capable of sensing an instantaneous magnitude of the electrical current in either direction, wherein (d) comprises measuring the instantaneous magnitude of the electrical current in either direction, via the sense line, and the method further comprises (e) determining a time interval beginning at a time when the instantaneous magnitude rises above one or more overflow magnitudes and ending at a time when the instantaneous magnitude falls below the one or more overflow magnitudes, in response to the measured instantaneous magnitude, wherein (c) comprises switching off the electrical current in either direction by applying a second signal to the control terminal, via the control line, when the time interval is substantially equal to one or more overflow time intervals. Preferably, the sensor is further capable of sensing a difference magnitude of the electrical current in either direction between two consecutive instantaneous magnitudes of the electrical current obtained a difference time interval apart, wherein (d) comprises measuring the difference magnitude of the electrical current in either direction, via the sense line, and wherein (c) comprises, in response to the measured difference magnitude, switching off the electrical current in either direction by applying a second signal to the control terminal, via the control line, when the difference magnitude is greater than one or more change magnitudes. Preferably, the sensor is further capable of sensing a temperature of the bi-directional switch module, and the method further comprises (e) measuring the temperature of the bi-directional switch module, via the sense line, wherein (c) comprises, in response to the measured temperature, switching off the electrical current in either direction by applying a second signal to the control terminal, via the control line, when the temperature is greater than one or more overheat temperatures.

According to one preferred embodiment, the step (b) of the method comprises filtering the two or more alternating phase signals and calculating a first and second DC values from two of the two or more filtered alternating phase signals.

According to one preferred embodiment, the switch module comprises (i) a bi-directional switch capable of switching on/off the electrical current in either direction between a first and a second terminal of the bi-directional switch in response to the control signal applied to a control terminal of the bi-directional switch, and (ii) a sensor capable of sensing an average magnitude of the electrical current in either direction between the first and the second terminal of the bi-directional switch, and the method further comprises (d) measuring the average magnitude of the electrical current in either direction, via a sense line, wherein (c) comprises, in response to the measured average magnitude, controllably switching off the electrical current flowing into an electrical load by applying a first signal to the control terminal of the bi-directional switch. Preferably, the control signal is applied when a ratio between an absolute value of a difference between the first and second average values and the first average value is greater than a threshold value.

BRIEF DESCRIPTION OF THE DRAWINGS

FIG. 1-A shows a schematic diagram of a vehicle electrical system comprising a generator, electrical loads, battery, control device, and switch module which comprises a bi-directional switch and a sensor.

FIG. 2-A shows a schematic diagram of a vehicle electrical system comprising a generator, electrical loads, battery, control device, and switch module which comprises a bi-directional switch, a sensor and a processor.

DETAILED DESCRIPTION OF THE PRESENTLY PREFERRED EMBODIMENTS

Figure 1:
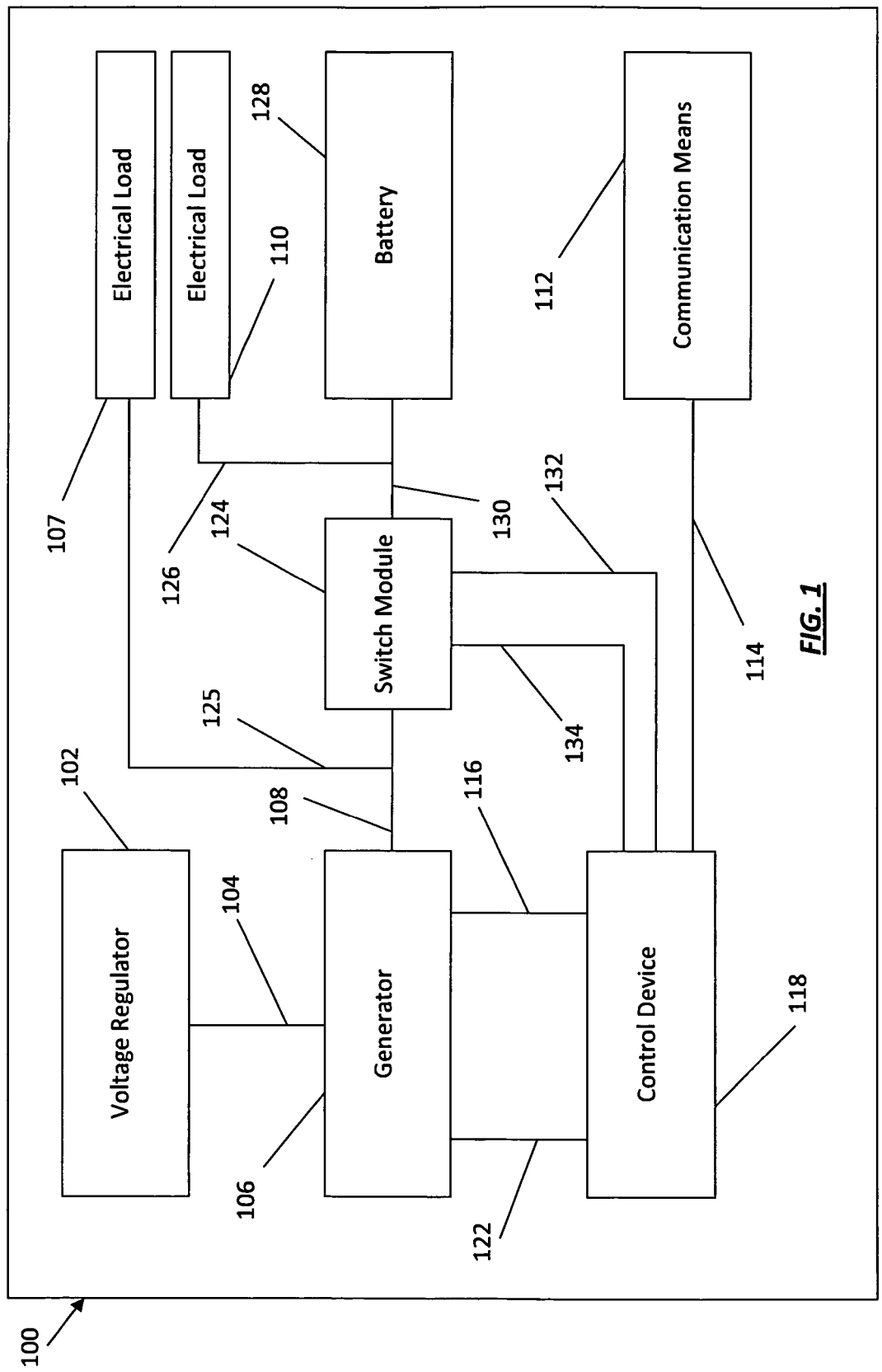
FIG. 1 shows a block diagram of a vehicle electrical system comprising a generator, a voltage regulator, electrical loads, battery, communications means, switch module, and control device according to a preferred embodiment.

FIG. 1 depicts a block diagram of a preferred embodiment of a vehicle electrical system 100, including a generator 106, a voltage regulator 102, electrical loads 107 and 110, communication means 112, switch module 124, battery 128, and a control device 118. The control device 118 is connected to and in communication with the generator 106 via lines 116 and 122. The voltage regulator 102 operates to maintain the generator output voltage at a constant voltage as the speed of the generator 106 and electrical loads 107 and 110 vary. The electrical loads 107 and 110 represent electrical loads by electrical components which may comprise a heating element, an air conditioning unit, a compressor, a cooling fan, headlights, or a pump, to name a few examples. As these electrical loads are applied and removed from the generator 106, the voltage regulator 102 varies the output power of the generator 106, via the generator's output power controller (not shown), so as to meet the electrical power requirement of the electrical loads 107 and 110. The battery 128 operates to provide electrical power to the electrical loads 107 and 110 when the vehicle engine (not shown) is not operating or when the generator 106 is not producing electrical power.

The switch module 124 operates to maintain the magnitude of electrical current in either direction within one or more default average magnitudes. It should be noted that the switch module 124 is a bi-directional switch module capable of controlling electrical current in either direction. The control device 118 is also connected to and in communication with the switch module 124 via lines 132 and 134. The control device 118 operates to measure two alternating phase signals, generated by two phase windings from one or more stator windings included in the generator 106 (shown in more detail in FIG. 2). When the average values of the alternating phase signals, DC1 and DC2, differ from one another, the control device 118 utilizes the switch module 124 to control the average magnitude of electrical current in either direction through the switch module 124.

In this preferred embodiment, when the average values of the alternating phase signals DC1 and DC2, measured via the lines 116 and 122, are different, the control device 118 operates to sense the average magnitude of electrical current in both directions, measured by a sensor within the switch module 124 (shown in more detail in FIG. 1-A), via the line 132, and switch on/off a bi-directional switch within the switch module 124 (shown in more detail in FIG. 1-A), via the line 134, so that the average magnitude of electrical current does not exceed one or more default average magnitudes. As such, the control device 118 operates to control the average magnitude of electrical current flowing from the generator 106 to the electrical load 110 and battery 128, and average magnitude of electrical current flowing from the battery 128 to the electrical load 107 and generator 106.

In one embodiment, the generator 106 is a brushless alternator having two or more phase windings (not shown) associated with one or more stator windings (not shown). The generator 106 further includes a field coil (not shown) that generates a magnetic field when a field current passes through the field coil. The magnetic field interacts with the one or more stator windings in the generator (not shown), inducing voltage across the stators which, in turn, produce the generator output current through line 108 for consumption by the electrical loads 107 and 110 and battery 128. The voltage regulator 102 is coupled with the generator field coil via line 104 and operates to regulate the system voltage at a regulation voltage, for instance 28 V, by switching on/off the field coil, thereby, varying the average value of the field current.

In addition to power control and over voltage protection of the generator 106, afforded by the regulator 102, as discussed in the co-pending U.S. patent application Ser. No. 12/460,659, additional protection and control can be achieved by monitoring the two or more phase windings of the generator 106 and controlling the average magnitudes of electrical current in either direction via the switch module 124. The control device 118 is coupled with two phase windings via lines 116 and 122. The control device 118 is further coupled with the switch module 124 vial the lines 132 and 134. The two phase windings generate two alternating phase signals that, under normal conditions, produce nearly the same average values, DC1 and DC2. The control device 118 determines these average values and may switch on/off the bi-directional switch within the switch module 124, via line 134, when DC1 differs from DC2. In particular, when DC1 differs from DC2 by a predetermined value, the control device 118 senses the average magnitude of electrical current in either direction through the switch module 124, via the sensor within the switch module 124, and switches on/off the bi-directional switch within the switch module, such that the average magnitude of electrical current in either direction does not exceed one or more default average magnitudes.

The loss of symmetry between DC1 and DC2 indicates that the generator 106 may be malfunctioning and therefore electrical current distribution between the generator 106, electrical loads 107, 110, and battery 128 should be controlled. Depending on the amount of symmetry loss, the control device 118 calculates or retrieves from a look-up-table one or more default average magnitudes of electrical current so that the average magnitude of electrical current in either direction through the switch module 124 does not exceed the one or more default average magnitudes. In one instance, when the loss of symmetry becomes progressively larger, the control device 118 may accordingly increase the electrical current flow from the battery 124 to electrical load 107 to compensate for any deficit in electrical current that has been caused by the malfunctioning generator 106.

FIG. 1-A depicts a schematic diagram of one preferred embodiment of the vehicle electrical system 100 utilizing the switch module 124. According to this preferred embodiment the switch module 124 comprises a bi-directional switch 144 which includes a first terminal and a second terminal wherein electrical current flow in either direction, at 142 or 146, between said terminals can be controlled by applying a control signal via line 134 to a control terminal 140 of the bi-directional switch 144, and a sensor 138 operative to measure an average magnitude of the electrical current in either direction, at 142 or 146, between said terminals and making it available via a signal on a sense line 132. When the average value DC1 differs from average value DC2, the control device 118 operates to controllably switch on/off the electrical current in either direction, at 142 or 146, by applying a time-varying control signal via line 134 to the control terminal 140 so that the average magnitude of the electrical current, received via the sense line 132, does not exceed one or more default average magnitudes, which may be either calculated by the control device 118 or retrieved from a look-up-table stored in the control device 118, as a function of the symmetry loss between DC1 and DC2.

For instance, the switch module 124 is initially configured so that the bi-directional switch 144 conducts electrical current in both directions, at 142 or 146, between the generator 106 and electrical load 107, on the one hand, and the battery 128 and electrical load 110, on the other hand. The sensor 138 measures an average value of the electrical current in a particular direction and generates a signal on the sense line 132 containing the average value and the corresponding direction of the electrical current. The control device 118 receives the average value and the direction via the sense line 132 and compares the average value to the default average value associated with that direction. If the average value is below the default average value for that particular direction, the control device 118 takes no action with respect to applying a time-varying control signal. When the average value exceeds the default average value, the control device 118 applies a time-varying control signal via the line 134 to control the average magnitude of current in that direction.

Figure 2:
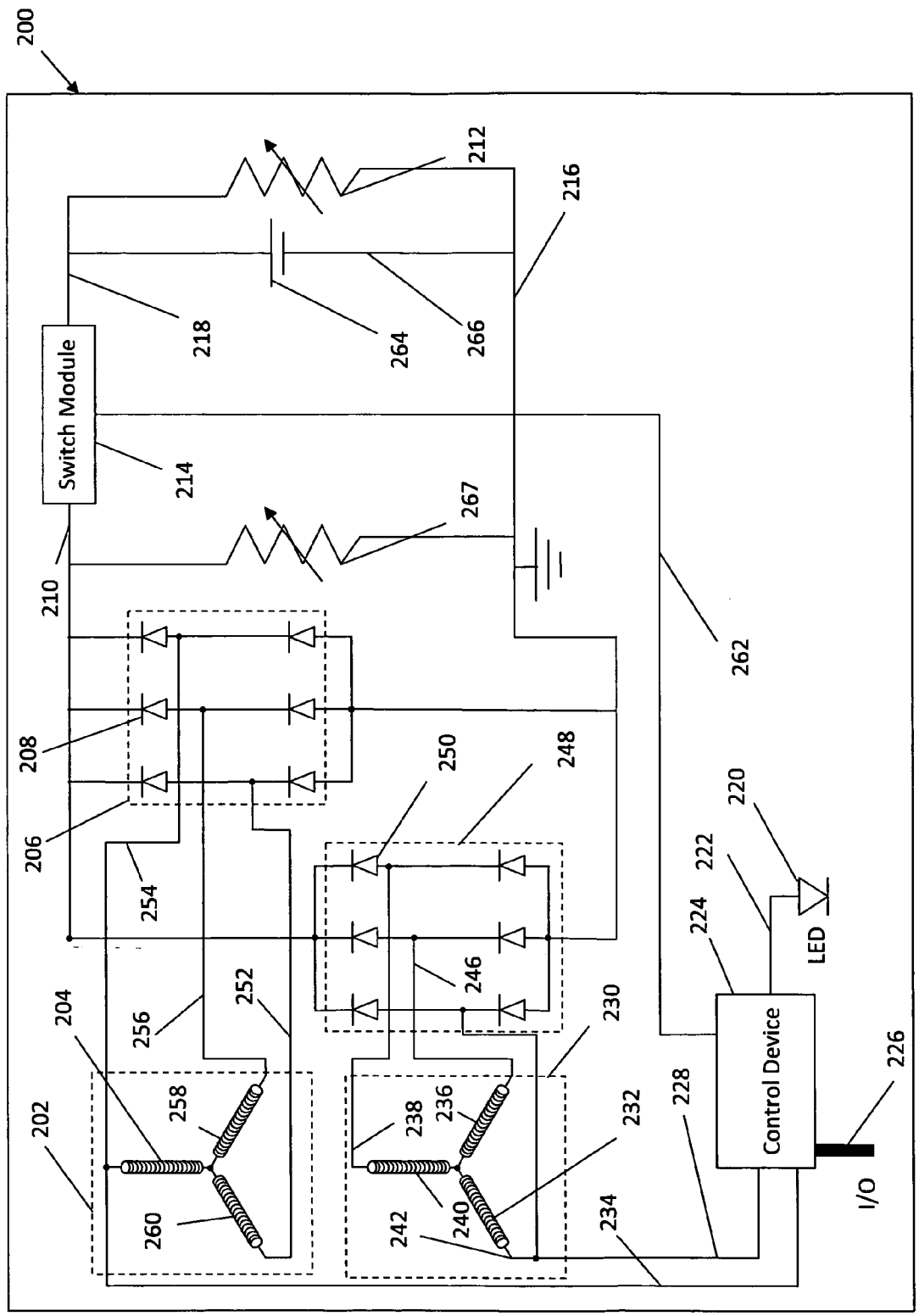
FIG. 2 shows a schematic diagram of a vehicle electrical system comprising a dual-stator generator with the associated phase windings and rectifier circuits, electrical loads, battery, communications means, switch module, and control device according to a preferred embodiment.

FIG. 2 depicts a schematic diagram of the electrical connections between the various components within a vehicle electrical system 200, according to a preferred embodiment. A generator, such as the generator 106, comprises two three-phase stator windings 202 and 230, and two full-wave rectifier circuits 206 and 248. The first stator 202 is comprised of three phase windings 204, 258, and 260. The phase windings 204, 258, and 260 generate three alternating phase signals on lines 254, 256, and 252, respectively. Such phase signals generally are not sinusoidal, square, quasi-square, or any other form of symmetric waveforms. The second stator 230 is comprised of three phase windings 232, 236, and 240. The phase windings 232, 236, and 240 generate three alternating phase signals on lines 242, 246, and 238, respectively. The generator 106 produces electrical current at its output 210, through a switch module 214, to an electrical load 212 and ground at 216. The electrical load 212 represents one or more electrical loads by electrical components such as those mentioned above. A control device 224 is coupled with the first and second stator windings 202 and 230 via lines 228 and 234. According to this embodiment, the control device 224 measures the alternating phase signals generated by the phase winding 204 and 240 of the first and second stator windings 202 and 230, respectively. The control device 224 is further coupled with the switch module 214 via a line 262 and communication means, LED 220 and I/O Port via lines 222 and 226.

In this configuration as depicted in FIG. 2 the control device 224 operates to determine a first and second average values, DC1 and DC2, of two of the alternating phase signals generated by two of the phase windings 204, 258, 260, 232, 236, and 240. It controls electrical current distribution between the generator 106 and electrical load 267, on the one hand, and battery 264 and electrical load 212, on the other hand, in response to a loss of symmetry between the first and second average values DC1 and DC2 by applying a control signal to the switch module 214 via the line 262, when the first average value DC1 differs from the second average value DC2 by a predetermined value. The term symmetry refers to the symmetry between two different waveforms associated with two different phases amongst phase windings 204, 258, 260, 232, 236, and 240, not for the positive and negative parts of an individual waveform associated with each of the phases as is the case for traditional determination of AC system health.

The generator 106, as represented by the two three-phase stator windings 202 and 230 and two full-wave rectifier circuits 206 and 248, is coupled with the electrical load 212 and battery 264 via the switch module 214. According to this embodiment, the control device 224 controls the amount of electrical current that passes through the switch module between the generator 106, electrical load 267 and 212, and battery 264. The generator 106 may be a brushless alternator. For a dual stator brushless alternator, as in this embodiment, a rotor is used as a means to vary the magnetic field through the stator windings 202 and 230, thereby creating an alternating current that is rectified via the two full-wave rectifier circuits 206 and 248. The rectified current is then fed to the electrical load 212.

The generator 106 is ordinarily used in a vehicle and thus subjected to shock and vibration. The generator 106 is further subjected to high ambient temperatures during operation. These conditions may give rise to phase winding and/or rectifier failure. Such failures affect the alternating current through the phase windings 204, 258, 260, 240, 236, and 232. During normal operating conditions, the average values of the alternating currents through these phase windings are nearly the same. When a failure of one of the phase windings, such as a shorted phase or rectifier diode, occurs the average values change accordingly. It should be noted that the present invention is independent of the normal changes in average waveform value associated with load surge, load dump, overload, soft start, and the like. The control device 224 applies a control signal containing one or more default average magnitudes of electrical current which may be calculated or retrieved from a look-up-table, via the line 262, based on the amount of change which will be discussed in more detail below.

FIG. 2-A depicts a schematic diagram of one preferred embodiment of the vehicle electrical system 200 utilizing the switch module 214. According to this preferred embodiment the switch module 214 comprises a bi-directional switch 278 which includes a first terminal and a second terminal wherein electrical current flow in either direction, at 276 or 280, between said terminals can be controlled by applying a control signal via line 284 to a control terminal 282 of the bi-directional switch 278, a sensor 272 operative to measure an average magnitude of the electrical current in either direction, at 276 or 280, between said terminals and making it available via a signal on a sense line 290, and a processor 286 operative to controllably switch on/off the electrical current in either direction, at 276 or 280, by applying a time-varying control signal via line 284 to the control terminal 282 so that the average magnitude of the electrical current, received via the sense line 290, does not exceed one or more default average magnitudes, which is received from the control device 224 via line 262. The values of the one or more default average magnitudes depend on the loss of symmetry in the alternating phase signals as manifested in the average values DC1 and DC2. According to this preferred embodiment, all that control device 224 has to do is to either calculate or retrieve from a look-up-table stored in the control device 224, the values of the one or more default average magnitudes which as discussed before are functions of the symmetry loss between DC1 and DC2, and transmit them to the processor 286 via the line 262. Therefore, in this preferred embodiment, the switching of the bi-directional switch 278 is performed solely by the processor 286, i.e., the switch module 214 operates exactly as that described in the U.S. Pat. No. 7,432,613 without any intervention by the control device 224 other than the latter providing the former with the one or more default average magnitudes. When the average value DC1 differs from average value DC2, the control device 224 provides the processor 286 with the two or more default average magnitudes and the processor 286 operates to controllably switch on/off the electrical current in either direction, at 276 or 280, by applying a time-varying control signal via line 284 to the control terminal 282 so that the average magnitude of the electrical current, received via the sense line 290, does not exceed the one or more default average magnitudes.

For instance, the switch module 214 is initially configured so that the bi-directional switch 278 conducts electrical current in both directions, at 276 or 280, between the generator 268 and electrical load 267, on the one hand, and the battery 264 and electrical load 212, on the other hand. The sensor 272 measures an average value of the electrical current in a particular direction and generates a signal on the sense line 290 containing the average value and the corresponding direction of the electrical current. The processor 286 receives the average value and the direction via the sense line 290 and compares the average value to the default average value associated with that direction, which it receives from the control device 224 via the line 262. If the average value is below the default average value for that particular direction, the processor 286 takes no action with respect to applying a time-varying control signal. When the average value exceeds the default average value, the processor 286 applies a time-varying control signal via the line 284 to control the average magnitude of current in that direction.

Figure 3:
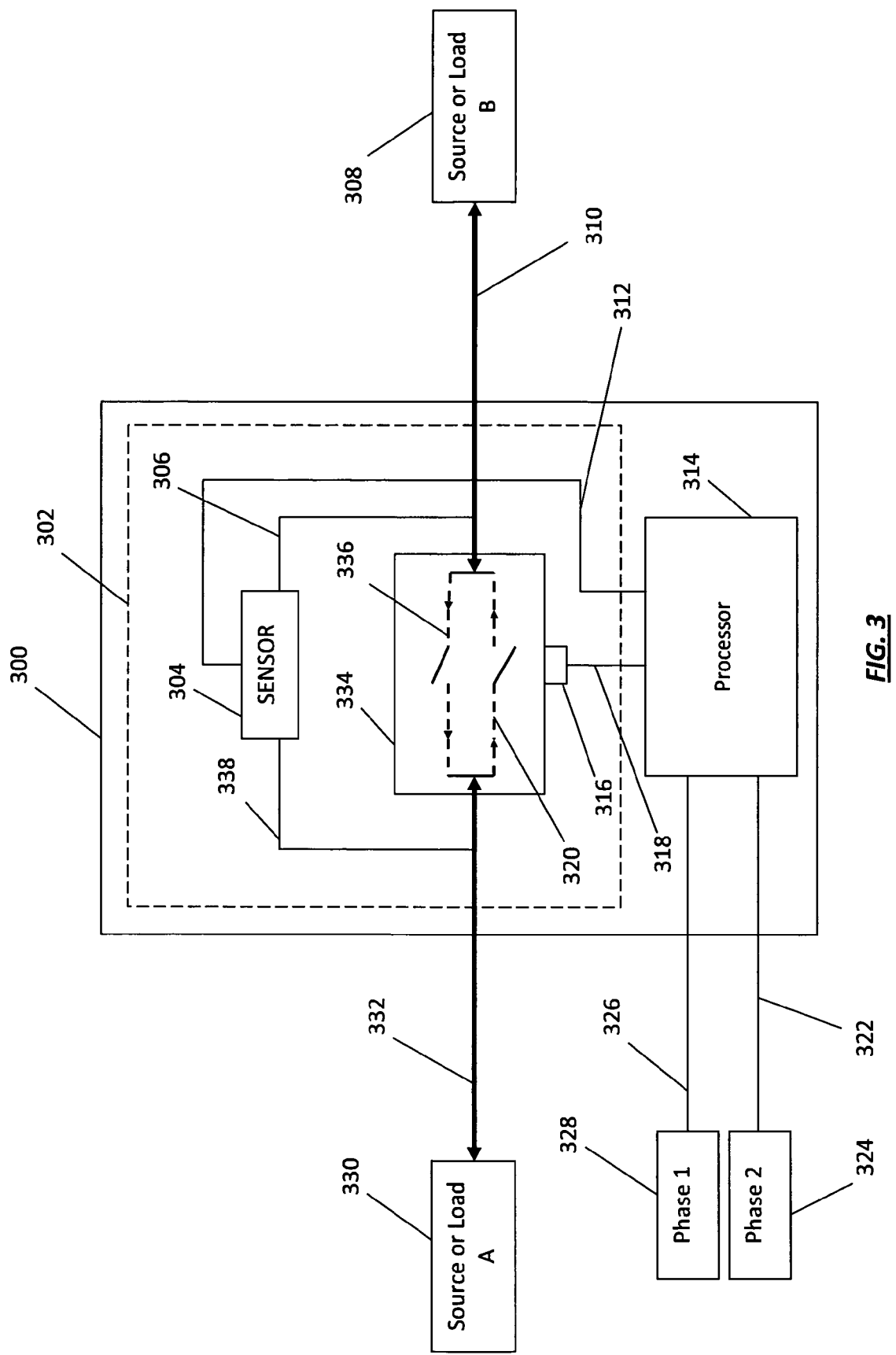
FIG. 3 shows a schematic diagram of a control device comprising a processor and a switch module that includes a bi-directional switch coupled with two electrical components which may be either a source or a load, and a sensor, the control device measuring two alternating phase signals generated by a generator and controlling electrical current between the two electrical components in response to the measured alternating phase signals according to a preferred embodiment.

FIG. 3 is a schematic diagram of a control device 300, including a processor 314 and a switch module 302. The switch module 302 comprises a bi-directional switch 334 which includes a first terminal and a second terminal wherein electrical current flow in either direction, at 320 or 336, between said terminals can be controlled by applying a control signal via line 318 to a control terminal 316 of the bi-directional switch 334, and a sensor 304 operative to measure an average magnitude of the electrical current in either direction, at 320 or 336, between said terminals and making it available via a signal on a sense line 312. The processor 314 is configured to measure alternating phase signals, generated by two phase windings 324 and 328. The two terminals of the bi-directional switch 334 are coupled with source/load A and source/load B at 330 and 308, respectively. The source/load A and B are electrical components that may operate either as an electrical load or electrical source, such as a battery or generator.

In this preferred embodiment, the control device 300 is coupled with only two such source/load devices. However, it should be clear to an artisan with ordinary skill that there are no limitations as to how many source/load electrical components may be controlled by the control device 300. It should further be clear to an artisan of ordinary skill that the two terminal of the bi-direction switch 334 may be coupled with electrical components that are purely electrical source, electrical load or combination thereof.

For instance, multiple switch modules, such as the switch module 302, may be utilized throughout the vehicle electrical system to couple various electrical components within the vehicle electrical system, all controlled by the processor 314 of the control device 300. In this configuration, the control device 300 operates to measure the average values of the two alternating phase signals of a generator, DC1 and DC2, and selectively control the electrical current distribution between the various electrical components throughout the vehicle electrical system via the multiple switch modules based on the loss of symmetry between DC1 and DC2.

In another instance where only one switch module is utilized, one of the terminals of the switch module may be coupled with a battery which operates both as an electrical source and load, and the other terminal of the switch module may be coupled with a heating element which operates only as an electrical load. Based on the average values, DC1 and DC2, of the alternating phase signals of a generator, as presented by the phases 324 and 328, the control device 300 controls electrical current distribution between the battery and heating element.

In either case, when the average value DC1 differs from average value DC2, the processor 314 operates to controllably switch on/off the electrical current in either direction, at 320 or 336, by applying a time-varying control signal via line 318 to the control terminal 316 so that the average magnitude of the electrical current, received via the sense line 312, does not exceed one or more default average magnitudes, which may be either calculated by the processor 314 or retrieved from a look-up-table, stored in the processor 314, as a function of the symmetry loss between DC1 and DC2. Furthermore, controlling of the current distribution is not limited to average magnitudes of electrical current, but it may be based on instantaneous magnitudes, time intervals between rise and fall of electrical current, and even temperature of the switch module 302 as described in as described in the U.S. Pat. No. 7,432,613.

The processor 314 may be analog or digital such as a microprocessor. In one preferred embodiment, the microprocessor is a 68HC08 processor having internal flash memory available from Freescale of Scottsdale, Ariz. It is contemplated that the processor may be a combination of individual discrete or separate integrated circuits packaged in a single housing or it may be fabricated in a single integrated circuit. The switch module 302 may be a semiconductor switch module.

According to this preferred embodiment, the processor 314 is coupled with two phase windings 324 and 328 via lines 322 and 326. The phase windings 324 and 328 generate alternating phase voltage signals on the lines 322 and 326 whose DC values are nearly identical during normal operating conditions. According to one embodiment, the processor 314 measures the alternating phase voltage signals across one end of the phase winding 324, 328 and ground. The processor 314 obtains average values DC1 and DC2 of the alternating phase voltage signals. According to a preferred embodiment, the processor 314 filters the alternating phase voltage signals prior to determining the average values. A low pass digital filter known to artisans of ordinary skill may be utilized. Based on loss of symmetry between DC1 and DC2, the processor 314 calculates or retrieves from a look-up-table stored in the processor 314, one or more default average magnitudes. The processor 314 then uses the bi-directional switch 322 to control electrical current distribution between source/load A and B at 330 and 308, respectively, based on the average magnitudes of the electrical current, received via the sense line 312, so that the average magnitudes do not exceed the one or more default average magnitudes. The term symmetry refers to the symmetry between two different waveforms associated with phases 324 and 328, not for the positive and negative parts of an individual waveform associated with each of the phases 324 and 328. The loss of symmetry may be manifested in different ways, two of which are described in more detail below.

Figure 4:
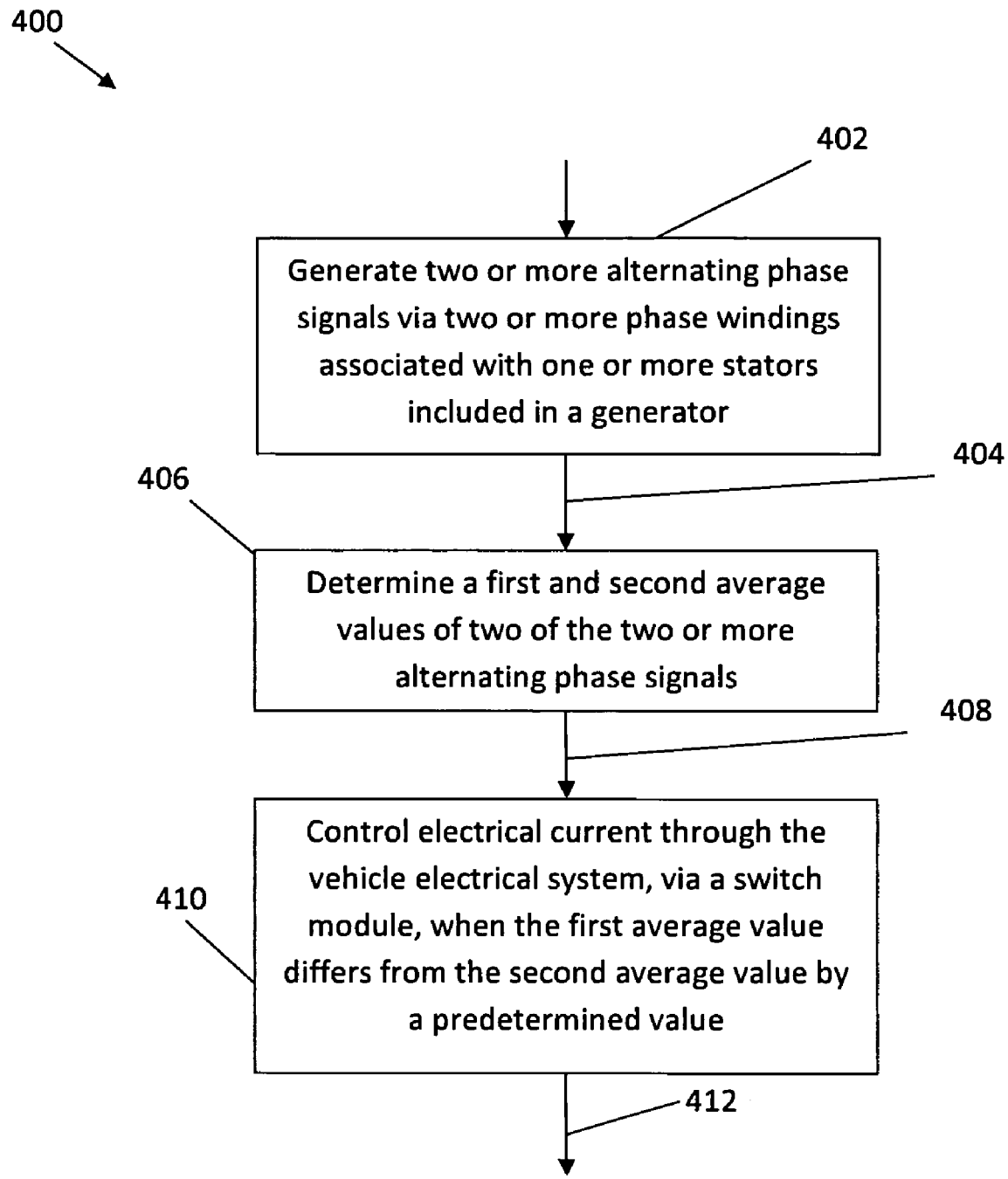
FIG. 4 is a flow diagram of one preferred method of monitoring two alternating phase signals generated by a generator and controlling electrical current through the vehicle electrical system via a switch module.

FIG. 4 is a flow diagram 400 of one preferred method of operation of the vehicle electrical system of FIG. 2. According to this embodiment, the method comprises generating two or more alternating phase signals via two or more phase windings associated with one or more stator windings included in the generator at 402. In general, such phase signals are not sinusoidal, square, quasi-square, or any other form of symmetric waveforms. A first and second average values of two of the two or more alternating phase signals, such as DC1 and DC2 described above, are determined at 406, via the control device 224. The control device 224 compares DC1 and DC2 to each other and controls electrical current distribution at 410 by applying a control signal, containing one or more default average magnitudes, to the switch module 214. In this embodiment, the switch module 214 is a standalone component whose processor receives the one or more default average magnitudes from the control device 224 and operates to controllably switch on/off the electrical current in either direction by via the bi-directional switch, included in the switch module 214, so that the average magnitude does not exceed the one or more default average magnitudes.

Figure 5:
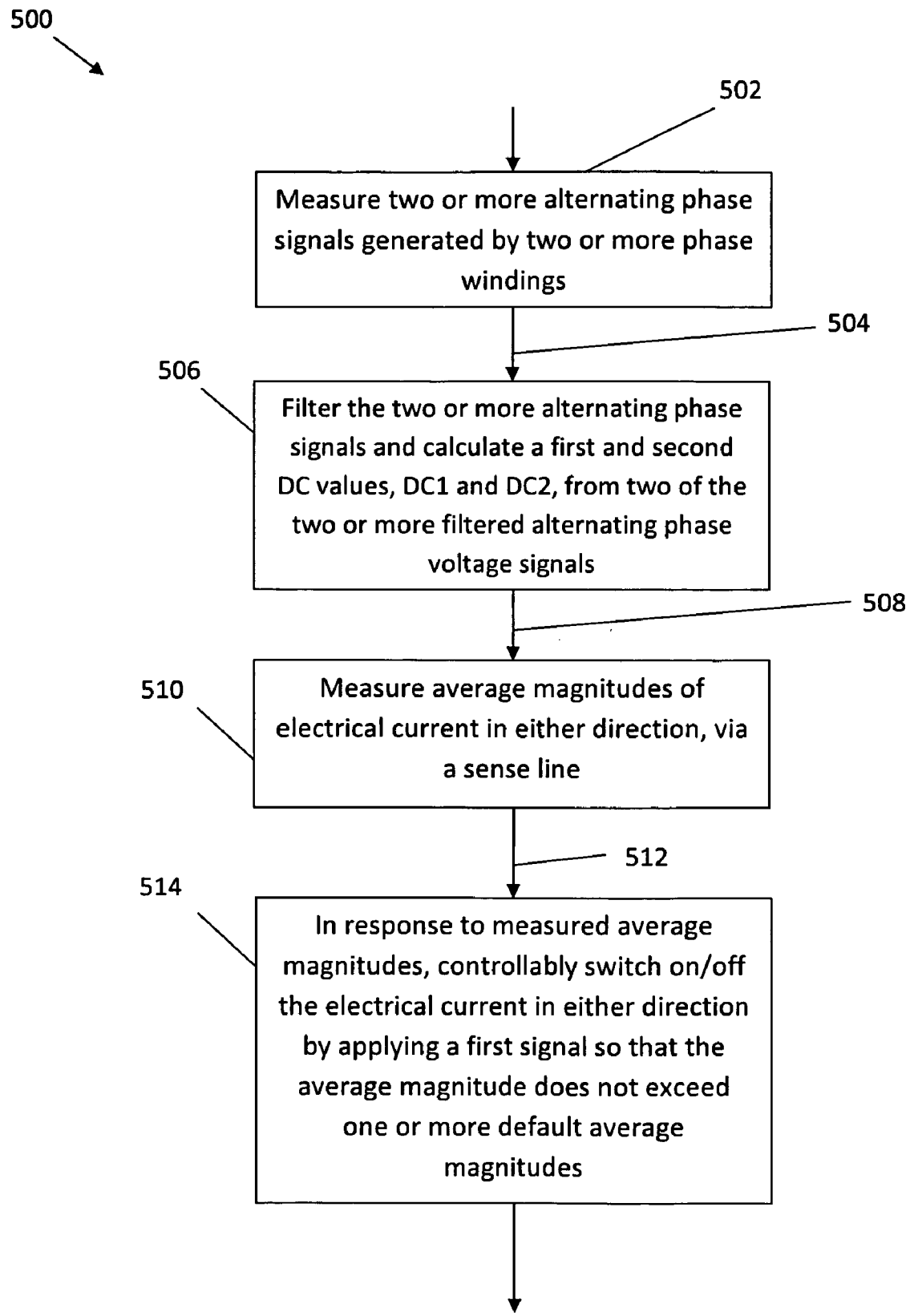
FIG. 5 is a flow diagram of one preferred method of measuring two alternating phase signals generated by a generator and controlling electrical current between two electrical components, specifically illustrating the processing steps performed by the control device.

FIG. 5 is a flow diagram 500 of one preferred method of operation of the control device 300 of FIG. 3. The method includes measuring two or more alternating phase voltage signals between one end of the corresponding phase windings and ground at 502. According to this preferred embodiment, the processor 314 is a microprocessor and the alternating phase voltage signals generated by the two phases 324 and 328 are digitized using an analog to digital convertor included in the processor 314. Preferably, the analog signals are first filtered via a low pass analog filter to avoid aliasing before the signals are digitized by said analog to digital convertor. The digitized signals are then filtered, preferably using a low pass digital filter to eliminate noise at 506. Each of the filtered digital signals is then averaged and a first and second DC values, DC1 and DC2, are obtained at 506. The processor 314, further measures average magnitudes of electrical current in either direction, via the sense line 312, as obtained by the sensor 304. The processor 314, in response to measured average magnitudes, controllably switches on/off the electrical current in either direction by applying a signal to the control terminal 316 of the bi-directional switch 334 so that the average magnitude does not exceed one or more default average magnitudes between the source/load A and B 330 and 308, at 514.

Figure 6:
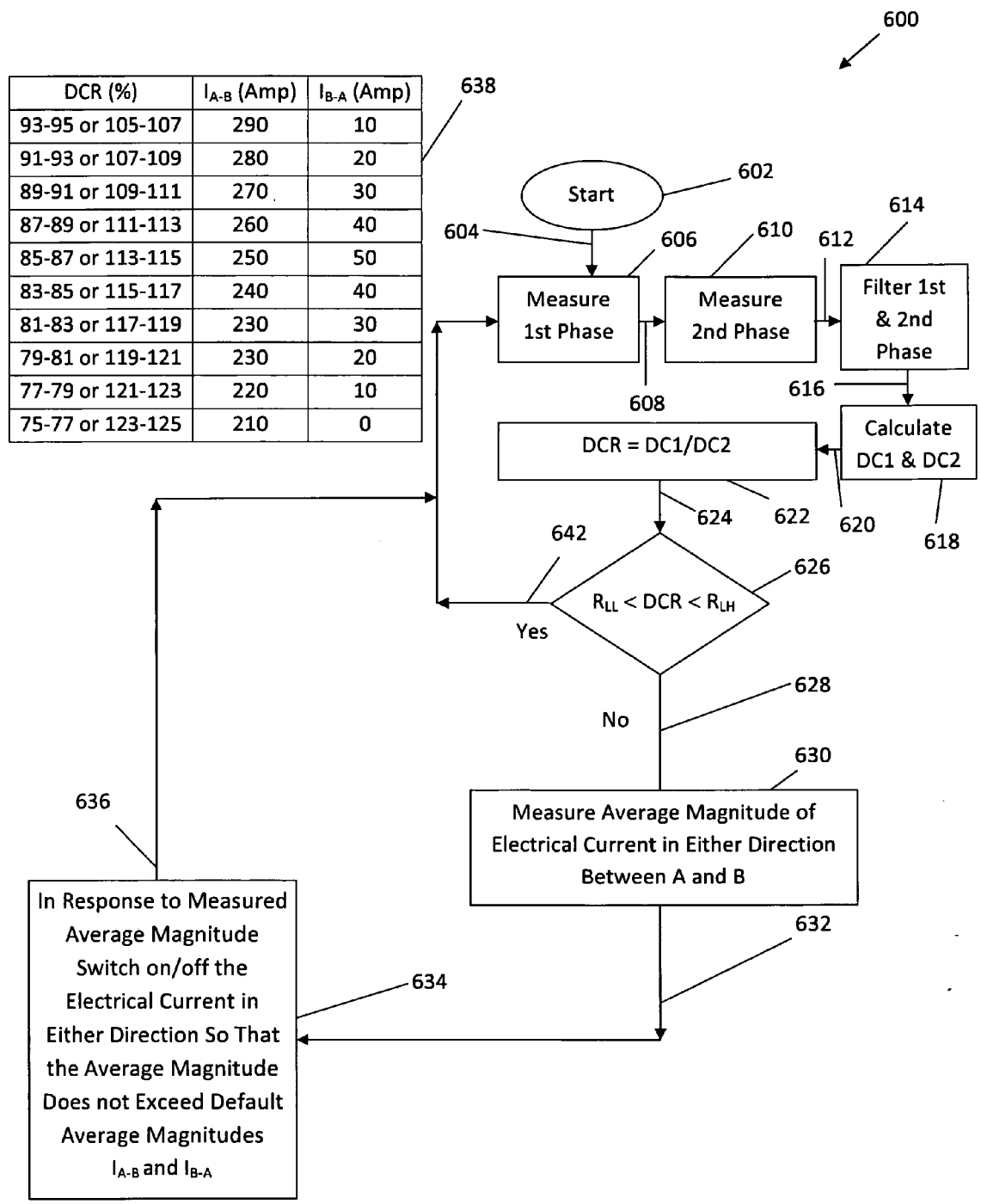
FIG. 6 is a flow diagram of one preferred method of measuring two alternating phase signals generated by a generator and controlling electrical current between two electrical components A and B that may be implemented on a processor, included in the control device, further detailing the electrical current distribution between the two electrical components in accordance with the DC values of the alternating phase signals.

FIG. 6 is a flow diagram 600 of one preferred method of operation of the control device 300 of FIG. 3, further illustrating the implementation of a programming code in a processor such as the processor 314. Upon power up at 602, the processor 314 measures a first alternating phase voltage signal from a first phase at 606. The processor 314 then measures a second alternating phase voltage signal from a second phase, belonging to the same or a different stator, at 610. The processor 314 performs digital filtering operation on the two phase voltage signals at 614 and computes two DC values, DC1 and DC2, from the filtered signals at 618. DC1 and DC2 are compared to one another by computing the ratio DCR=DC1/DC2 at 622. It should be clear to artisans of ordinary skill that the ratio DCR could as well be computed by dividing DC2 by DC1. Consequently, there is no preference for any one phase winding in these calculations. DCR is then compared to a range between $R_{LL}$ and $R_{LH}$. If DCR is within this range, i.e. normal conditions, the processor 314 branches at 642 to measure another set of alternating phase voltage signals. However, if DCR is outside of the range between $R_{LL}$ and $R_{LH}$, i.e. malfunction, then the processor 314 branches at 628 to measure average magnitude of electrical current in either direction between A and B at 630. Depending on the severity of the loss of symmetry between phase one and phase two and in response to the measured average magnitudes in either direction, the processor 314 switches on/off the electrical current in either direction so that the average magnitude does not exceed default average magnitudes, as shown in an illustrative look-up-table 638, at 636.

Figure 7:
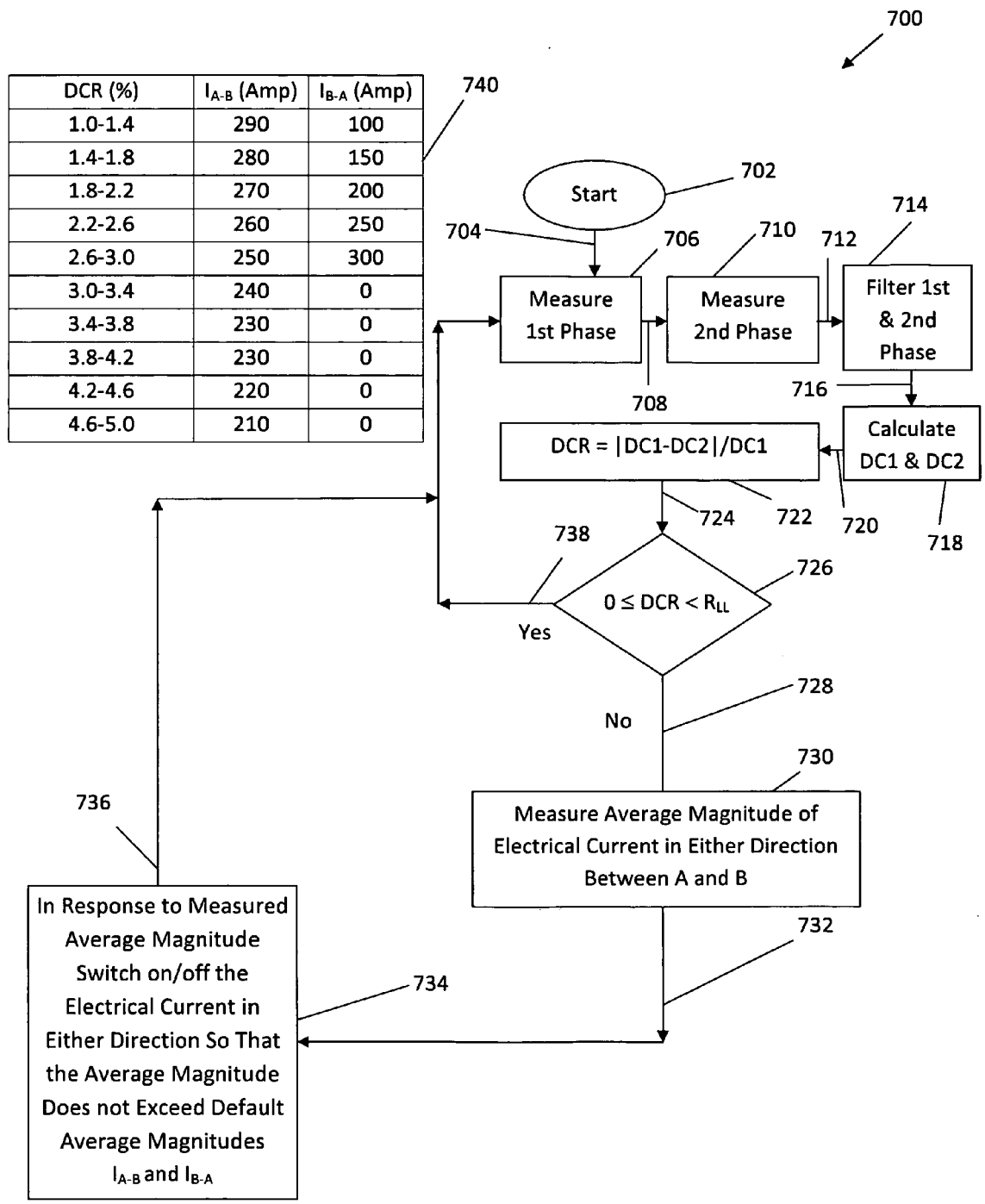
FIG. 7 is a flow diagram of one preferred method of measuring two alternating phase signals generated by a generator and controlling electrical current between two electrical components A and B that may be implemented on a processor, included in the control device, further detailing the electrical current distribution between the two electrical components in accordance with the DC values of the alternating phase signals.

FIG. 7 is a flow diagram 700 of one preferred method of operation of the control device 300 of FIG. 3, further illustrating another implementation of a programming code in the processor 314. In particular, the present implementation involves a different way of evaluating the loss of symmetry between the two phases. Upon power up at 702, the processor 314 measures a first alternating phase voltage signal from a first phase at 706 and a second alternating phase voltage signal from a second phase, belonging to the same or a different stator, at 710. The processor 314 performs digital filtering operation on the two phase voltage signals at 714 and computes two DC values, DC1 and DC2, from the filtered signals at 718. DC1 and DC2 are compared to one another by computing the ratio DCR=|DC1−DC2|/DC1 at 722. It should be clear to artisans of ordinary skill that the ratio DCR could as well be computed by subtracting DC1 from DC2 and dividing the result by DC2. Consequently, there is no preference for any one phase winding in these calculations. DCR is then compared to a range between 0 and $R_{LL}$ at 726. If DCR is within this range, i.e. normal conditions, the processor 314 branches at 738, to measure another set of alternating phase voltage signals. However, if DCR is outside of the range between 0 and $R_{LL}$, i.e. malfunction, then the processor 314 branches at 728 to measure average magnitude of electrical current in either direction between A and B at 730. Depending on the severity of the loss of symmetry between phase one and phase two and in response to the measured average magnitudes in either direction, the processor 314 switches on/off the electrical current in either direction so that the average magnitude does not exceed default average magnitudes, as shown in an illustrative look-up-table 740, at 734.

The foregoing discloses a vehicle electrical system comprising a generator and a control device that monitors the generator phase windings and controls the electrical current distribution between various electrical components within the vehicle electrical system via a switch module. The control device determines a loss of symmetry between two alternating phase signals generated by the generator phase windings, calculates or retrieves from a look-up-table, one or more default average magnitudes and applies a control signal to the switch module so that that the average magnitude of electrical current between the electrical components in either direction does not exceed the one or more default average magnitudes.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system comprising:
   (a) a generator comprising two or more phase windings associated with one or more stators, said two or more phase windings operative to generate two or more alternating phase signals; and
   (b) a control device responsive to the two or more alternating phase signals and operative to determine a first and second average values of two of the two or more alternating phase signals, and to control electrical current through the vehicle electrical system, via a switch module, when the first average value differs from the second average value by a predetermined value.

2. The system of claim 1, wherein the switch module comprises:
   (i) a bi-directional switch capable of switching on/off the electrical current in either direction between a first and a second terminal of the bi-directional switch in response to a control signal applied to a control terminal of the bi-directional switch; and
   (ii) a sensor capable of sensing an average magnitude of the electrical current in either direction between the first and the second terminal of the bi-directional switch;
   wherein the control device is further configured to sense the average magnitude of the electrical current in either direction, via the sensor, and, in response to the sensed average magnitude, to controllably switch on/off the electrical current in either direction by applying a first signal to the control terminal of the bi-directional switch so that the average magnitude does not exceed one or more default average magnitudes.

3. The system of claim 2, wherein the bi-directional switch comprises a bi-directional semiconductor switch.

4. The system of claim 2, wherein the sensor comprises an electrical current sensor capable of sensing an average magnitude of the electrical current in either direction.

5. The system of claim 1, wherein the control device is configured to apply a control signal to the switch module to control the electrical current through the vehicle electrical system.

6. The system of claim 5, wherein the switch module comprises:
(i) a bi-directional switch capable of switching on/off the electrical current in either direction between a first and a second terminal of the bi-directional switch in response to a control signal applied to a control terminal of the bi-directional switch;
(ii) a sensor capable of sensing an average magnitude of the electrical current in either direction between the first and the second terminal of the bi-directional switch; and
(iii) a processor, including a programmable code operable on the processor;
wherein the processor is responsive to the control signal and configured to sense the average magnitude of the electrical current in either direction, via the sensor, and, in response to the sensed average magnitude, to controllably switch on/off the electrical current in either direction by applying a first signal to the control terminal of the bi-directional switch so that the average magnitude does not exceed one or more default average magnitudes.

7. The system of claim 5, wherein the switch module comprises:
(i) a bi-directional switch capable of switching on/off the electrical current in either direction between a first and a second terminal of the bi-directional switch in response to a control signal applied to a control terminal of the bi-directional switch;
(ii) a sensor capable of sensing an average magnitude of the electrical current in either direction between the first and the second terminal of the bi-directional switch; and
(iii) a processor, including a programmable code operable on the processor;
wherein the processor is responsive to the control signal and configured to sense the average magnitude of the electrical current in either direction, via the sensor, and, in response to the sensed average magnitude, to controllably switch off the electrical current flowing into the generator by applying a first signal to the control terminal of the bi-directional switch.

8. The system of claim 7, wherein the control signal is applied when a ratio between the first and second average values is outside of a predetermined range.

9. A method for controlling a vehicle electrical system, said system comprising a generator, said method comprising:
(a) generating two or more alternating phase signals via two or more phase windings associated with one or more stators included in the generator;
(b) determining a first and second average values of two of the two or more alternating phase signals; and
(c) controlling electrical current through the vehicle electrical system, via a switch module, when the first average value differs from the second average value by a predetermined value.

10. The method of claim 9, wherein the switch module comprises:
(i) a bi-directional switch capable of switching on/off the electrical current in either direction between a first and a second terminal of the bi-directional switch in response to a control signal applied to a control terminal of the bi-directional switch; and
(ii) a sensor capable of sensing an average magnitude of the electrical current in either direction between the first and the second terminal of the bi-directional switch;
said method further comprising:
(d) sensing the average magnitude, via the sensor;
wherein (c) comprises, in response to the sensed average magnitude, controllably switching on/off the electrical current in either direction by applying a first signal to the control terminal of the bi-directional switch so that the average magnitude does not exceed one or more default average magnitudes.

11. A control device for a vehicle electrical system including a generator, said generator comprising two or more phase windings associated with one or more stators, said two or more phase windings operative to generate two or more alternating phase signals, said control device comprising:
(i) a switch module; and
(ii) a processor, including a programming code operable on the processor, coupled with the two or more phase windings and the switch module;
wherein said processor is configured to:
(a) measure the two or more alternating phase signals, via two or more lines;
(b) determine a first and second average values of two of the two or more alternating phase signals; and
(c) apply a control signal to the switch module to control electrical current through the vehicle electrical system, via a control line, when the first average value differs from the second average value by a predetermined value.

12. The control device of claim 11, wherein the switch module comprises:
(i) a bi-directional switch capable of switching on/off the electrical current in either direction between a first and a second terminal of the bi-directional switch in response to the control signal applied to a control terminal of the bi-directional switch; and
(ii) a sensor capable of sensing an average magnitude of the electrical current in either direction between the first and the second terminal of the bi-directional switch;
wherein said processor is further configured to measure the average magnitude of the electrical current in either direction, via a sense line, and, in response to the measured average magnitude, to controllably switch on/off the electrical current in either direction by applying a first signal to the control terminal of the bi-directional switch, via the control line, so that the average magnitude does not exceed one or more default average magnitudes.

13. The control device of claim 12, wherein the sensor is further capable of sensing an instantaneous magnitude of the electrical current in either direction, and wherein the processor is further configured to measure the instantaneous magnitude of the electrical current in either direction, via the sense line, and, in response to the measured instantaneous magnitude, to switch off the electrical current in either direction by applying a second signal to the control terminal, via the control line, when the instantaneous magnitude is greater than one or more surge magnitudes.

14. The control device of claim 12, wherein the sensor is further capable of sensing an instantaneous magnitude of the electrical current in either direction, and wherein the processor is further configured to measure the instantaneous magnitude of the electrical current in either direction, via the sense line, and, in response to the measured instantaneous magnitude, to determine a time interval beginning at a time when the instantaneous magnitude rises above one or more overflow magnitudes and ending at a time when the instantaneous magnitude falls below the one or more overflow magnitudes, and to switch off the electrical current in either direction by applying a second signal to the control terminal, via the control line, when the time interval is substantially equal to one or more overflow time intervals.

15. The control device of claim 12, wherein the sensor is further capable of sensing a difference magnitude of the electrical current in either direction between two consecutive instantaneous magnitudes of the electrical current obtained a difference time interval apart, and wherein the processor is further configured to measure the difference magnitude of the electrical current in either direction, via the sense line, and, in response to the measured difference magnitude, to switch off the electrical current in either direction by applying a second signal to the control terminal, via the control line, when the difference magnitude is greater than one or more change magnitudes.

16. The control device of claim 12, wherein the sensor is further capable of sensing a temperature of the bi-directional switch module, and wherein the processor is further configured to measure the temperature, via the sense line, and, in response to the measured temperature, to switch off the electrical current in either direction by applying a second signal to the control terminal, via the control line, when the temperature is greater than one or more overheat temperatures.

17. A method for controlling electrical current through a vehicle electrical system including a generator, said generator comprising two or more phase windings associated with one or more stators, said two or more phase windings operative to generate two or more alternating phase signals, said method comprising:
(a) measuring the two or more alternating phase signals, via two or more lines;
(b) determining a first and second average values of two of the two or more phase signals; and
(c) applying a control signal to a switch module to control the electrical current through the vehicle electrical system, via a control line, when the first average value differs from the second average value by a predetermined value.

18. The method of claim 17, wherein the switch module comprises:
(i) a bi-directional switch capable of switching on/off the electrical current in either direction between a first and a second terminal of the bi-directional switch in response to the control signal applied to a control terminal of the bi-directional switch; and
(ii) a sensor capable of sensing an average magnitude of the electrical current in either direction between the first and the second terminal of the bi-directional switch;
said method further comprising:
(d) measuring the average magnitude of the electrical current in either direction, via a sense line;
wherein (c) comprises, in response to the measured average magnitude, controllably switching on/off the electrical current in either direction by applying a first signal to the control terminal of the bi-directional switch, via the control line, so that the average magnitude does not exceed one or more default average magnitudes.

19. The method of claim 18, wherein the sensor is further capable of sensing an instantaneous magnitude of the electrical current in either direction:
wherein (d) comprises measuring the instantaneous magnitude of the electrical current in either direction, via the sense line;
wherein (c) comprises, in response to the measured instantaneous magnitude, switching off the electrical current in either direction by applying a second signal to the control terminal, via the control line, when the instantaneous magnitude is greater than one or more surge magnitudes.

20. The method of claim 18, wherein the sensor is further capable of sensing an instantaneous magnitude of the electrical current in either direction:
wherein (d) comprises measuring the instantaneous magnitude of the electrical current in either direction, via the sense line; said method further comprising:
(e) determining a time interval beginning at a time when the instantaneous magnitude rises above one or more overflow magnitudes and ending at a time when the instantaneous magnitude falls below the one or more overflow magnitudes, in response to the measured instantaneous magnitude;
wherein (c) comprises switching off the electrical current in either direction by applying a second signal to the control terminal, via the control line, when the time interval is substantially equal to one or more overflow time intervals.

21. The method of claim 18, wherein the sensor is further capable of sensing a difference magnitude of the electrical current in either direction between two consecutive instantaneous magnitudes of the electrical current obtained a difference time interval apart:
wherein (d) comprises measuring the difference magnitude of the electrical current in either direction, via the sense line;
wherein (c) comprises, in response to the measured difference magnitude, switching off the electrical current in either direction by applying a second signal to the control terminal, via the control line, when the difference magnitude is greater than one or more change magnitudes.

22. The method of claim 18, wherein the sensor is further capable of sensing a temperature of the bi-directional switch module, said method further comprising:
(e) measuring the temperature of the bi-directional switch module, via the sense line;
wherein (c) comprises, in response to the measured temperature, switching off the electrical current in either direction by applying a second signal to the control terminal, via the control line, when the temperature is greater than one or more overheat temperatures.

23. The method of claim 17, wherein (b) comprises filtering the two or more alternating phase signals and calculating a first and second DC values from two of the two or more filtered alternating phase signals.

24. The method of claim 17, wherein the switch module comprises:
(i) a bi-directional switch capable of switching on/off the electrical current in either direction between a first and a second terminal of the bi-directional switch in response to the control signal applied to a control terminal of the bi-directional switch; and
(ii) a sensor capable of sensing an average magnitude of the electrical current in either direction between the first and the second terminal of the bi-directional switch;
said method further comprising:
(d) measuring the average magnitude of the electrical current in either direction, via a sense line;
wherein (c) comprises, in response to the measured average magnitude, controllably switching off the electrical current flowing into an electrical load by applying a first signal to the control terminal of the bi-directional switch.

25. The method of claim 24, wherein the control signal is applied when a ratio between an absolute value of a difference between the first and second average values and the first average value is greater than a threshold value.

* * * * *